June 12, 1956

J. CURTIS 2,749,975

LEVER-ACTUATED TIRE BEAD BREAKER
WITH SHIFTABLE FULCRUM MEANS

Filed Oct. 12, 1954

INVENTOR.
Joseph Curtis
BY
Albert H. Kirchner
ATTORNEY

June 12, 1956

J. CURTIS 2,749,975

LEVER-ACTUATED TIRE BEAD BREAKER
WITH SHIFTABLE FULCRUM MEANS

Filed Oct. 12, 1954

INVENTOR
Joseph Curtis
BY Albert H. Kirchner
ATTORNEY of Patent Office 2,749,975
Patented June 12, 1956

2,749,975

LEVER-ACTUATED TIRE BEAD BREAKER WITH SHIFTABLE FULCRUM MEANS

Joseph Curtis, Mechanicsburg, Pa.

Application October 12, 1954, Serial No. 461,758

7 Claims. (Cl. 157—1.26)

The present invention relates to machines for loosening tire casings from wheel rims.

Pneumatic tire casings, particularly those of the large sizes used on trucks and other commercial automative vehicles, frequently adhere with great tenacity to the wheel rims on which they are mounted and present serious problems in dismounting for repair or replacement. The primary purpose of the present invention is to provide a power-operated machine of simple construction on which a wheel having a tire casing in place on its rim can be mounted and held securely while an appropriate tool is forced by the machine progressively against successive areas of the tire side wall adjacent to the bead to dislodge the adhering bead from the rim. This action forces the bead and hence the tire side wall as a whole axially from the rim flange. The machine includes mechanisms fixed in position on a base for thrusting the tool downwardly against the casing on a wheel mounted on a fixed center on the base with means for rotating the wheel progressively to bring successive segments of the casing side wall under the influence of the tool for breaking the casing from its adherence to the rim.

The wheel with the tire casing mounted on it is readily removable from its mount on the base to be turned over after one of the casing beads is completely loosened from the adjacent rim flange, so that the operation can be repeated against the other casing bead so as to loosen it from the rim flange to which it is adhering.

Important objects of the invention are to provide a machine of the type indicated which will be simple and inexpensive to construct, efficient and certain in operation, and adjustable for use on tire casings and wheels of a wide range of sizes.

An important object of the invention is to provide a machine including a readily adjustable mechanical advantage by which the tool or tool head that engages the tire casing can be moved quickly with relatively low power into casing-engaging position and can then be quickly adjusted to force the tool against the tire casing with the application of increased power, at a relatively high mechanical advantage.

A related object is to provide a machine adapted to be readily adjusted to act in varying ratios of power and speed of movement in the actuation of a tool against a tire casing adhering to a rim to suit the different degrees of adherence of adjacent segments of the casing, so that ample power may be available for starting the loosening operation followed by longer and faster movement to speed completion of the separation when less power is required.

Other objects and features of the invention will be apparent to those skilled in the art from the following description of the preferred embodiment which is illustrated in the accompanying drawings in which Figure 1 is a side elevational view of the complete preferred embodiment of the invention, showing the machine in use;

Figure 1:
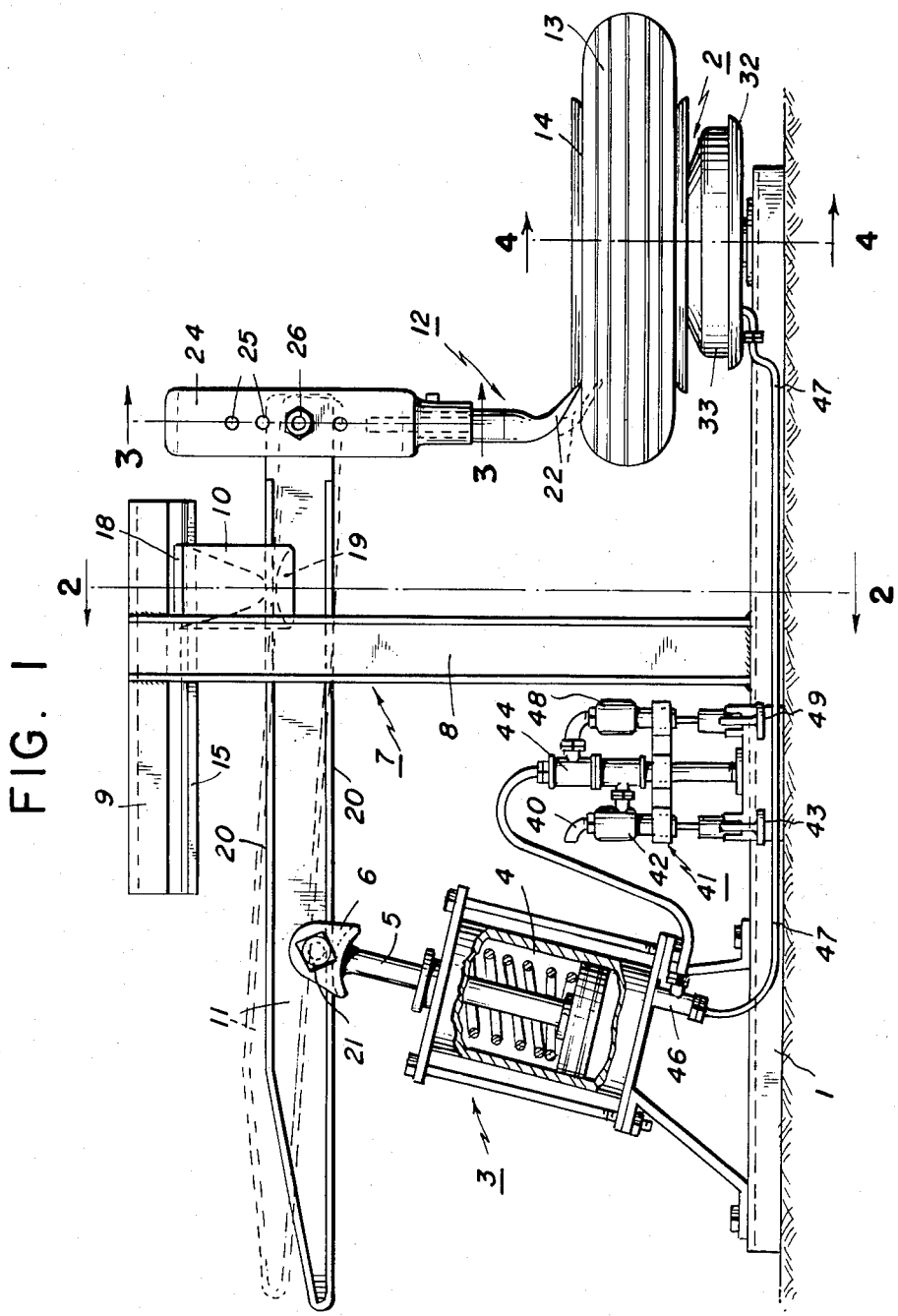

In these drawings, the reference numeral 1 designates a conventional type of base, which may be an appropriate length of wide, shallow channel iron having narrow downturned side flanges and a broad web providing a flat top surface. At one end portion of the base 1 a wheel mount, generally designated 2, is positioned, and at the opposite end portion there is fixed a thrust device 3 comprising a cylinder 4 positioned generally upright but inclined somewhat toward the wheel mount, containing a piston or plunger and having a piston rod 5 surmounted by a head 6 projecting axially from the top of the cylinder. This head is kept biased to lowered position by the expansion spring shown in the cylinder in Fig. 1.

Fixed to the intermediate portion of the base 1, between the wheel mount 2 and the thrust device 3, is a generally upright frame 7, preferably made in the form of a pair of upwardly converging legs 8 welded at their bottoms to the base and welded at their upper ends to a horizontal beam 9 which extends generally lengthwise along the base and spaced well above it.

The purpose of the frame 7, and particularly the beam 9 which forms part of the frame, is to provide a bearing for a fulcrum 10 which is adjustably lengthwise along the beam 9 and supports a lever 11 between the legs 8 in general parallelism to the beam 9 and base 1 so that this lever, acting as a lever of the first order, can be rocked about the fulcrum by thrust applied by the piston rod head element 6 to one end portion of the lever so as to cause the opposite end portion of the lever to swing downwardly and thrust a tool assembly 12 down into engagement with the side wall of the tire casing 13 fixed on the rim of a wheel 14 which is mounted on the wheel mounting means 2.

Figure 2:
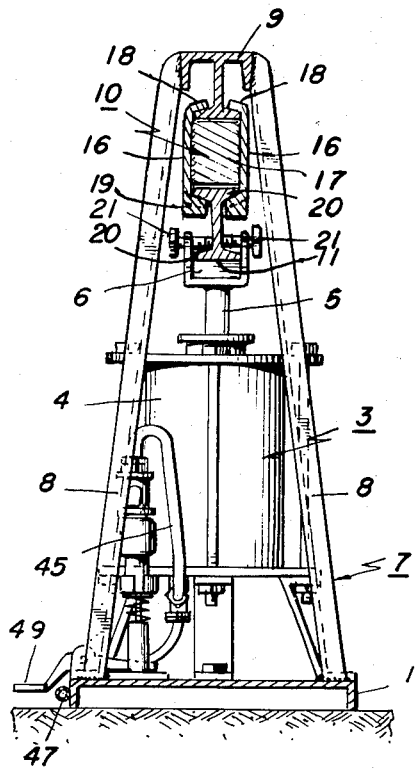
Fig. 2 is a vertical cross sectional view taken along the line 2—2 of Fig. 1.

The fulcrum 10 is made captive on and slideable along the beam 9, and to this end the lower edge of the beam may be provided with a pair of laterally directed flanges 15 and the fulcrum 10 can be formed of a pair of side plates 16 welded to a central core 17. The core is of generally triangular shape with a blunt apex lowermost, and the two plates may be of generally rectangular shape. The upper edges of the plates protrude above the base of the core and are turned inwardly thereover as at 18 to engage the beam flanges 15 and the lower edges of the plates extend below the apex of the core and are flanged inwardly, as shown at 19, to underlie the upper flange of the lever 11, along which the fulcrum is slideable. The connection of the fulcrum to the lever, as well as that of the piston rod head 6 to the lever, is conveniently made by providing the upper and lower edges of the lever with oppositely directed lateral flanges 20 so that the shape of the lever is that of an I-beam. Bolts 21 may be set in from each of the two opposite sides of the head 6 to hold the head engaged with the lower flanges 20 of the lever, as shown in Figs. 1 and 2.

Figure 3:
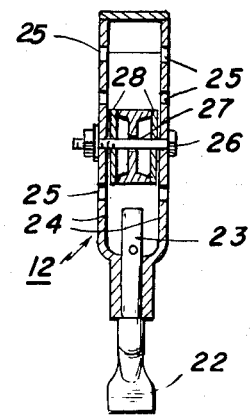
Fig. 3 is a vertical cross sectional view taken along the line 3—3 of Fig. 1.

The end of the lever which extends substantially over the tire mount 2 is fashioned for swinging connection to the tool assembly 12. This tool assembly may comprise a blade 22 having an upwardly extending shank 23 suitably shouldered and removably held in the lower chuck portion of a tool head which is the portion of the tool assembly that depends pivotally from the lever 11. As shown in Figs. 1 and 3, the head may be made of a pair of parallel side plates 24 connected together at their top ends and forming the chuck at their lower ends and having a series of aligned pairs of holes 25. A pin 26 may be passed through the holes of any pair and through a hole 27 in the lever 11 to effect the pivotal suspension of the tool from the lever. The connection may be improved by welding small pad plates 28 to the top and bottom flanges of the lever to provide good bearing surfaces for the side plates 24 of the tool head.

Figure 4:
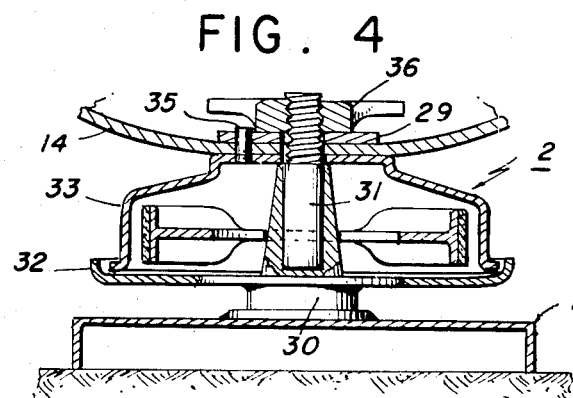
Fig. 4 is a vertical cross sectional view taken along the line 4—4 of Fig. 1.
Figure 5:
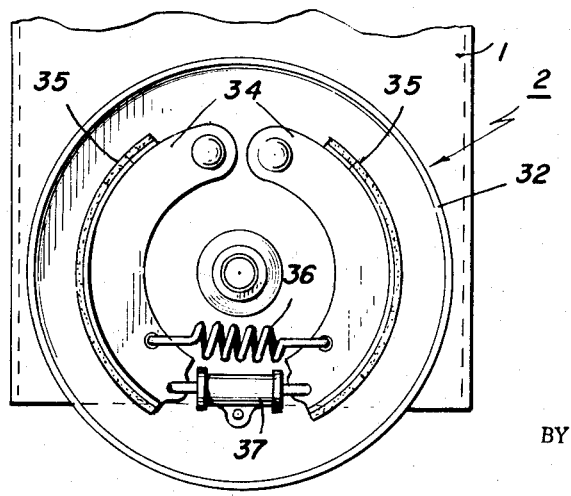
Fig. 5 is a horizontal plan view of the wheel mounting means with the wheel removed.

The wheel mount 2 comprises a step bearing 30 welded to the base 1 and journaling a vertical stub shaft 31 which is threaded at its upper end. The bearing 30 may be provided with a radially flaring pan 32 to form the generally closed bottom of a chamber which is completed by an inverted brake drum 33 mounted on a shoulder formed on the shaft 31. The chamber houses a brake assembly, conveniently comprising a pair of segmental shoes 34 having bands 35, each pivoted to the pan at one end and connected at their opposite ends by a contracting spring 36 and by a fluid pressure expansion cylinder 37. The disc of the wheel 14 is fitted over and dropped down and seated on the hub portion of the brake drum 33 and covered by a washer 29. A dowel 35 is then inserted through registering holes in the washer, wheel disc and brake drum hub, and the parts are held assembled by turning a wing nut 36 down on the upper threaded end portion of the shaft 31, all as shown in Fig. 4.

It will be evident that the wheel 14 can be rotated in the bearing 30 unless the shoes 34 are expanded into braking engagement with the drum 33 and that such braking engagement, applied by fluid pressure in the cylinder 37, will hold the wheel securely in any circumferentially adjusted position.

It will be recalled that the thrust device 3 is operable to force the tool blade 22 down on to the tire casing 13 by fluid pressure in the cylinder 4.

An important feature of the invention consists in correlating the operating pressures of the thrust cylinder 4 and the brake applying cylinder 37 by the means and for the purposes that will now be explained.

A source of fluid pressure, which may be the compressed air tank that is a practically essential fixture of all automotive service establishments, is connected to the inlet fitting 40 of a valve assembly generally designated 41, which is mounted on the base 1 adjacent the frame 7. This comprises an inlet valve 42 which is normally closed and is openable by a pedal 43 to admit fluid pressure to a junction 44. The junction is connected by a tube 45 to a fitting 46 which supplies the cylinder 4, and this fitting is also connected by a tube 47 with the brake expansion cylinder 37, all so arranged that when the valve 42 is opened the piston rod 5 will be elevated to swing the lever 11 and force the tool assembly 12 down, while at the same time the brake shoes 34 expand to hold the wheel 14 securely against rotation.

Also connected to the junction 44 is an exhaust valve 48 which is normally held closed but is openable by a pedal 49. Operation of this pedal will release fluid pressure from the junction and hence from the cylinders 4 and 37 to lower the piston rod 5 and to permit the spring 36 to contract the brake shoes 34. It will be recognized that this operation allows the tool to be lifted and the wheel 14 to be rotated to bring a new segment of the tire casing 13 beneath the blade 22 of the tool.

The operation of the machine is as follows:

A wheel 14 from which the tire casing 13 is to be removed is positioned on the wheel mount 2 and fixed in position on the drum 33 thereof by means of the dowel 35 and nut 36. The fulcrum 10 is then adjusted along the beam 9 and the lever 11 is slid through the head 6 to position the blade 22 of the tool directly over a segment of the tire casing side wall adjacent to the bead thereof. The fulcrum may be initially set at such position on the beam (somewhat to the left of its position in Fig. 1) to cause the tool blade to descend relatively quickly toward the tire casing on the application of upward thrust by the piston rod 5, with correspondingly little power. Thrust is applied by depressing the valve pedal 43, which has the effect also of expanding the brake shoes 34 to hold the wheel against rotation. If the resulting movement of the blade 22 fails to crack the tire casing from the wheel rim, the fulcrum 10 is moved to the right along the beam 9, toward the tool, without moving the lever relatively to the head 6, and the thrusting operation is repeated. The new ratio of work and power arms of the lever forces the blade 22 against the tire casing with increased power, applied at a lower rate of movement. The ratio is selected appropriately for breaking the most resistant adherence of casing to rim presented by even the largest tires and the oldest assemblies of tire and rim. It is found in practice that the initial breaking, at the first-selected segment of the casing, requires the greatest application of power. Once this first segment is loosened, the remainder of the casing bead can be separated from the rim with considerably less application of power.

With the first segment loosened, the pedal 49 is depressed to relieve the pressure in the system, lowering the piston rod 5 and freeing the wheel assembly for rotation. The tool 12 is raised to bring the blade 22 above the level of the wheel rim, and the wheel is rotated to position a new and unloosened segment directly under the blade. The fulcrum 10 is then shifted to the left, as viewed in Fig. 1, and the pedal 43 is depressed to secure the wheel in its new position and bring the blade down on to the newly positioned casing segment. This movement is at an increased rate of speed, and the blade moves farther down, relatively to the previous movement made when the fulcrum was positioned farther to the right on the beam. This faster and longer but less powerful movement is possible and effective because less power is required to continue the loosening operation than was required to start it.

The operation is continued in a series of steps around the wheel until the whole bead is freed from the rim. The wheel is then removed from the wheel mount, turned over and remounted to position the other bead of the tire casing uppermost, and the operation repeated until that bead is completely freed from its rim. The casing is then readily lifted from the wheel.

The machine shown in the drawings and hereinabove described has been illustrated and explained in terms of its use on disc wheels. The machine is equally well adapted for use on rim type wheels. This requires only the use of an adapter, which may consist of the disc of a disc wheel from which the rim portion has been cut off. This rimless disc is mounted on the wheel mount and the rim of the rim type wheel is then fitted down on the periphery of the disc and the operation conducted as has been explained.

It is believed that the essential structure, mode of operation and prinicpal advantages of the invention as incorporated in the preferred form of embodiment will be apparent to those skilled in the art from the present drawings and description. It is to be understood that other and further embodiments are capable of being made within the broad principles of the invention as pointed out in the broader of the appended claims.

I claim:

1. A machine for loosening a tire casing from a wheel rim comprising an elongated base, means at one end portion of the base for mounting a wheel having a tire casing thereon, a device at the other end portion of the base for exerting upward thrust, an upright frame mounted on the intermediate portion of the base, a fulcrum carried by the upper portion of the frame and adjustable thereon lengthwise with respect to the base above the level of said means and device, a lever of the first order having at one end a tool engageable with the tire casing and having its other end engageable by said thrust device for upward movement thereby, and means pivotally connecting an intermediate portion of the lever with the fulcrum for varying the mechanical advantage of the lever responsive to adjustment of the fulcrum along the frame.

2. A machine as claimed in claim 1 in which the upright frame comprises a pair of legs and a beam connecting the upper ends of the legs and having the fulcrum slidable along it.

3. A machine as claimed in claim 1 in which the thrust device comprises a fluid pressure actuated piston and cylinder combination.

4. A machine as claimed in claim 1 in which the means for mounting the wheel comprises a vertical shaft for insertion upwardly through an axial opening in the wheel, a brake drum surrounding the shaft and attachable to the wheel, and a brake shoe cooperating with the drum for holding the wheel against rotation.

5. A machine as claimed in claim 1 in which the thrust device comprises a fluid pressure actuated piston and cylinder combination and the wheel mounting means includes a fluid pressure actuated shoe for holding the wheel against rotation.

6. A machine as claimed in claim 1 in which the thrust device comprises a fluid pressure actuated piston and cylinder combination and the wheel mounting means includes a fluid pressure actuated shoe for holding the wheel against rotation, in combination with valve means for supplying fluid pressure simultaneously to the thrust device and wheel mounting means for operating the lever while the wheel is held against rotation.

7. A machine as claimed in claim 1 including a beam rigidly supported by the upper end of the upright frame and a generally triangular shaped fulcrum having its base connected to the beam for sliding along it and having its opposite apex pivotally connected to the lever.

References Cited in the file of this patent
UNITED STATES PATENTS

| | | |
|---|---|---|
| 262,519 | Walters | Aug. 8, 1882 |
| 1,124,316 | Pfleumer | Jan. 12, 1915 |
| 1,447,113 | Woodhall | Feb. 27, 1923 |
| 2,616,487 | Parks | Nov. 4, 1952 |
| 2,679,896 | Branick | June 1, 1954 |